(12) United States Patent
Oh

(10) Patent No.: US 11,187,273 B2
(45) Date of Patent: Nov. 30, 2021

(54) PROPELLER SHAFT ASSEMBLY

(71) Applicant: DANA AUTOMOTIVE SYSTEMS GROUP, LLC, Maumee, OH (US)

(72) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 388 days.

(21) Appl. No.: 16/095,576

(22) PCT Filed: Apr. 21, 2017

(86) PCT No.: PCT/US2017/028729
§ 371 (c)(1),
(2) Date: Oct. 22, 2018

(87) PCT Pub. No.: WO2017/184918
PCT Pub. Date: Oct. 26, 2017

(65) Prior Publication Data
US 2019/0085907 A1 Mar. 21, 2019

Related U.S. Application Data

(60) Provisional application No. 62/326,192, filed on Apr. 22, 2016, provisional application No. 62/394,541, filed on Sep. 14, 2016.

(51) Int. Cl.
*F16D 3/223* (2011.01)
*F16D 3/227* (2006.01)
*F16D 3/84* (2006.01)

(52) U.S. Cl.
CPC ............. *F16D 3/223* (2013.01); *F16D 3/227* (2013.01); *F16D 3/845* (2013.01);
(Continued)

(58) Field of Classification Search
CPC .......... F16D 3/223; F16D 3/227; F16D 3/845; F16D 2003/22306; F16D 2003/22303;
(Continued)

(56) References Cited

U.S. PATENT DOCUMENTS 4,023,382 A * 5/1977 Welschof ................ F16D 3/227
464/906
5,106,343 A * 4/1992 Sakaguchi .............. F16D 3/227
464/906

(Continued)

OTHER PUBLICATIONS

GKN Catalog, GKN Automotive, Inc., Auburn Hills, MI. (Year: 1993).*

*Primary Examiner* — Greg Binda
(74) *Attorney, Agent, or Firm* — Marshall & Melhorn, LLC

(57) ABSTRACT

A propeller shaft including a first shaft, a first constant velocity joint drivingly connected with the first shaft, a second shaft, a second constant velocity joint drivingly connected with the second shaft, a connecting shaft drivingly connecting the first constant velocity joint and the second constant velocity joint and a grease cover disposed about an axial end of the second constant velocity joint. The second constant velocity joint is provided with a spring mechanism including a spring, wherein a spring seat of the spring mechanism is positioned on one axial end of the spring and mates with the second shaft, and wherein another axial end of the spring mates with an additional spring seat that is formed in the grease cover of the second constant velocity joint. The second constant velocity joint further comprises a spacer positioned between the spring and the grease cover and attached to the grease cover, wherein the spring has an axial end portion and a reduced diameter (Continued)

portion, and wherein an outer diameter of the reduced diameter portion is less than an outer diameter of the axial end portion.

13 Claims, 15 Drawing Sheets

(52) U.S. Cl.
CPC .............. *F16D 2003/22303* (2013.01); *F16D 2003/22306* (2013.01); *F16D 2003/22309* (2013.01); *F16D 2300/06* (2013.01); *Y10S 464/906* (2013.01)

(58) Field of Classification Search
CPC ....... F16D 2003/22309; F16D 2300/06; F16D 3/22; F16D 3/28; Y10S 464/906
USPC ........................ 464/144, 145, 169, 15, 140
See application file for complete search history.

(56) References Cited

U.S. PATENT DOCUMENTS

| | | | |
|---|---|---|---|
| 5,356,341 | A | 10/1994 | Uchman et al. |
| 5,899,814 | A | 5/1999 | Murillo |
| 5,916,055 | A | 6/1999 | Wormbaecher |
| 6,280,338 | B1 * | 8/2001 | Hayama .................. F16D 3/223 |
| | | | 464/906 |
| 6,506,122 | B2 | 1/2003 | Nakagawa et al. |
| 6,733,396 | B2 | 5/2004 | Skvarla et al. |
| 8,029,375 | B2 | 10/2011 | Takekawa |
| 8,267,801 | B2 | 9/2012 | Gresse |
| 2005/0130751 | A1 | 6/2005 | Kuczera et al. |
| 2008/0234057 | A1 | 9/2008 | Takekawa |
| 2010/0292016 | A1 | 11/2010 | Wormsbaecher et al. |
| 2012/0010005 | A1 | 1/2012 | Fujio |
| 2013/0095932 | A1 | 4/2013 | Suzuki et al. |

* cited by examiner

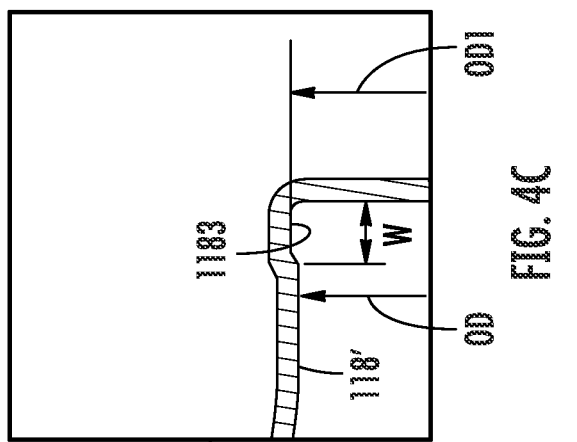
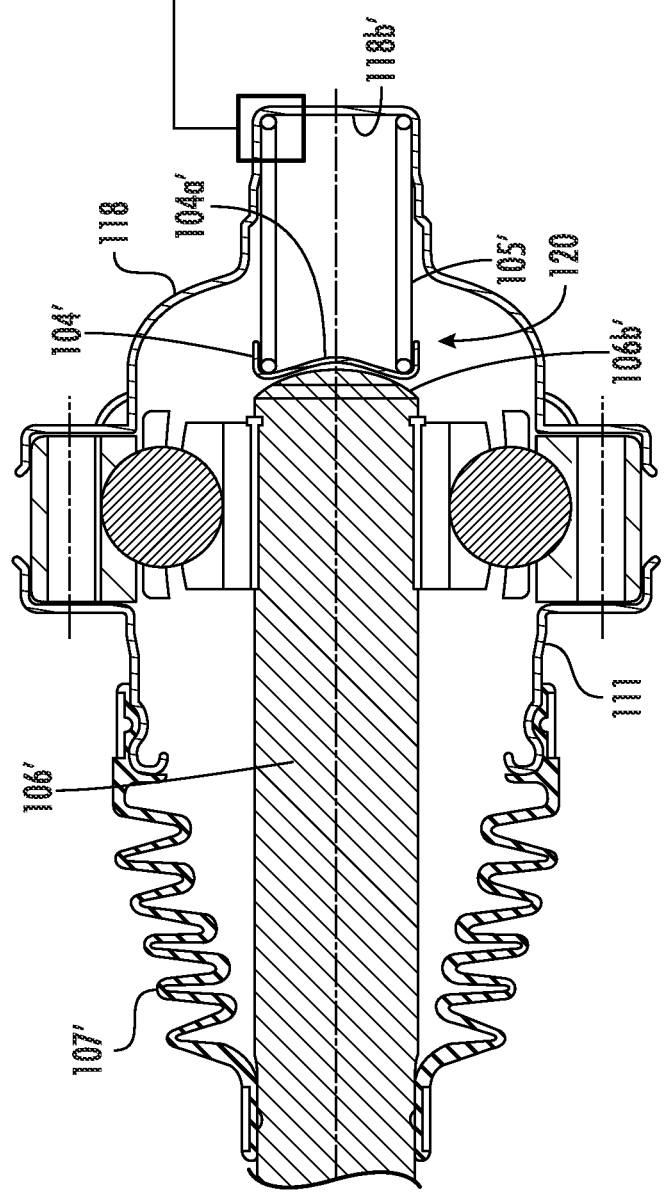

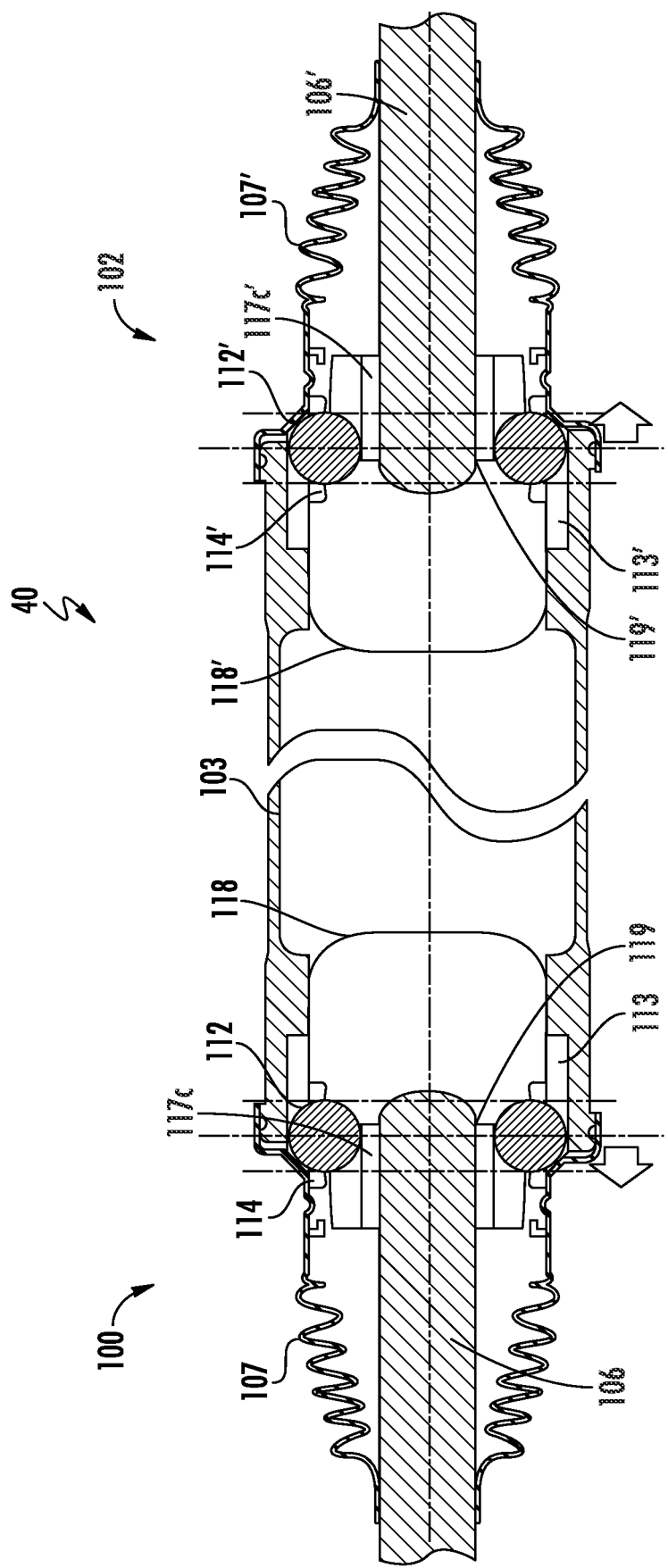

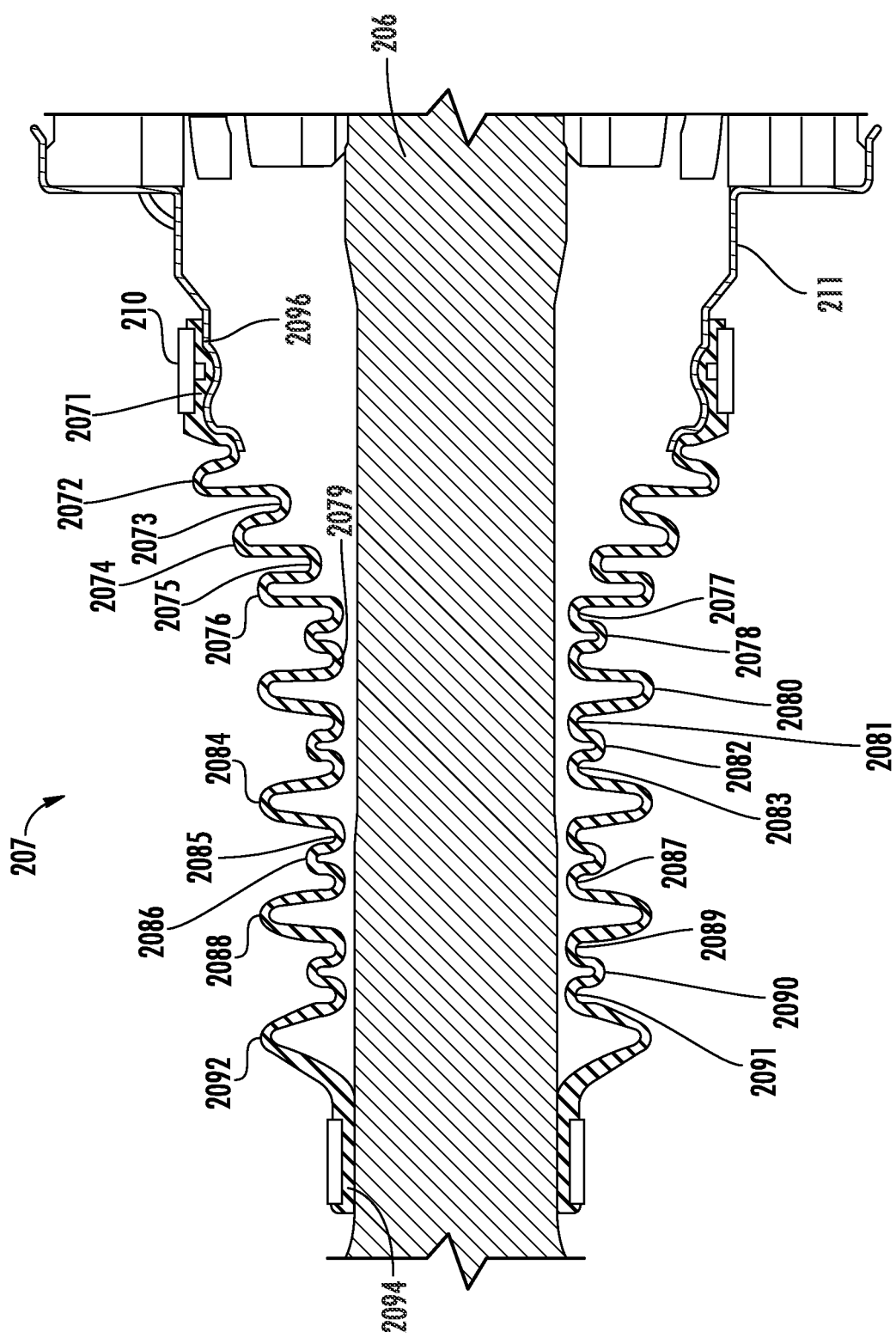

PROPELLER SHAFT ASSEMBLY

RELATED APPLICATIONS

This application is the National Stage of International Application No. PCT/US2017/028729, filed Apr. 21, 2017, which claims the benefit of U.S. Provisional Patent Application No. 62/326,192, filed on Apr. 22, 2016, and U.S. Provisional Patent Application No. 62/394,541, filed on Sep. 14, 2016, the entire disclosures of which are incorporated herein by reference.

FIELD

The present disclosure relates to a propeller shaft for a motor vehicle, more particularly, a propeller shaft having two cross groove constant velocity joints.

BACKGROUND

Motor vehicles use propeller or drive shafts to transfer torque via constant velocity joints from an input unit to an output unit. For example, propeller shafts are used to transfer torque and rotational movement from drive units to axle differentials in ail-wheel drive vehicles. Propeller shafts are equipped with constant velocity universal joints to accommodate angular and axial displacement caused by changes in the relative position between the input and output units.

A typical constant velocity universal joint includes a cylindrical inner race connected to a shaft and a hollow cylindrical outer race connected to another shaft. The outer surface of the inner race and the inner surface of the outer race have respective pluralities of grooves formed therein. Each groove formed in the outer surface of the inner race is associated with a corresponding groove formed in the inner surface of the outer race. A ball is disposed in each of the associated pairs of grooves and the balls provide a driving connection between the inner and outer races. A generally hollow cylindrical cage is provided between the inner and outer races for retaining the balls in the grooves. The cage has a plurality of windows formed in the surface thereof for receiving and retaining the halls.

One known type of constant velocity joint is commonly referred to as a cross groove constant velocity joint or a cross groove joint. In a cross groove joint, the grooves formed in the outer surface of the inner race are alternately inclined relative to the rotational axis of the joint. Similarly, the grooves formed in the inner surface of the outer race are alternately inclined in the opposite direction of the inner race grooves. Cross groove joints permit relative axial movement between the inner race and the cage and the cage and the outer race. Thus, the center of the joint, defined by the point of intersection of the rotational axes of the two shafts connected thereto, can move axially during use.

Constant velocity joints are widely used in motor vehicles and are commonly enclosed within a boot. Boots are well-known devices used to enclose an end of a constant velocity joint and keep out dirt, debris and moisture from the joint while keeping lubricant in the joint. Boots can be made from flexible materials including elastomers or plastic materials.

One specific type of boot is a convoluted boot. Convoluted boots have a plurality of axially spaced annular convolutions or folds that extend between two attachment portions used to attach the boot to two components of the constant velocity joint. When the joints rotate at a high speed under high temperature conditions, a boot can invert radially due to centrifugal forces and grease load. This radial inversion causes radial deformation and decreases the durability of the boot. The degree of radial inversion of the boot is effected by the geometry of the first peak and valley of the convolutions because the boot typically has the largest swing diameter in this region. A larger swing diameter tends to create a higher degree of radial inversion. Additionally, the boot can be subject to both plunging and articulation motion and must have a sufficient number of convolutions to absorb both motions simultaneously.

Therefore, a need exists for a propeller shaft using two cross groove joints that can prevent uneven distribution of axial loads to the cross groove joints increasing durability of the propeller shaft where the constant velocity joints have a boot that resists radial inversion to increase the durability in a cost effective manner.

SUMMARY

Provided herein is a propeller shaft including a first shaft, a first constant velocity joint drivingly connected with the first shaft, a second shaft, a second constant velocity joint drivingly connected with the second shaft, a connecting shaft drivingly connecting the first constant velocity joint and the second constant velocity joint and a grease cover disposed about an axial end of the second constant velocity joint. The first and second constant velocity joints include an outer race having an opening at least at one side in an axial direction and having a set of inwardly facing ball grooves, an inner race disposed inside of the outer race and having a set of outwardly facing ball grooves, a plurality of balls rollable in the outer race ball grooves and the inner race ball grooves for transmitting torque between the outer race and the inner race, a boot disposed about the outer race and a cage positioned between the outer race and inner race having a plurality of windows formed therein configured to accommodate the plurality balls therein. The windows have sidewalls walls with a diameter larger than the diameter of the balls and a length of the windows is larger than the diameter of the ball.

BRIEF DESCRIPTION OF THE DRAWINGS

The above, as well as other advantages of the present embodiments will become readily apparent to those skilled in the art from the following detailed description when considered in the light of the accompanying drawings in which:

FIG. 4B is a detailed section view of one the constant velocity joints in FIG. 4A;

FIG. 4C is a detailed section view of the groove and grease cover of the constant velocity joint in FIG. 4B;

FIG. 5 is a schematic cross-sectional side view of another preferred embodiment of a propeller shaft;

FIG. 6C is detailed section view of the boot of the propeller shaft in FIG. 6A.

DETAILED DESCRIPTION OF THE PREFERRED EMBODIMENTS

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments of the inventive concepts. Hence, specific dimensions, directions or other physical characteristics relating to the embodiments disclosed are not to be considered as limiting.

Figure 1A:
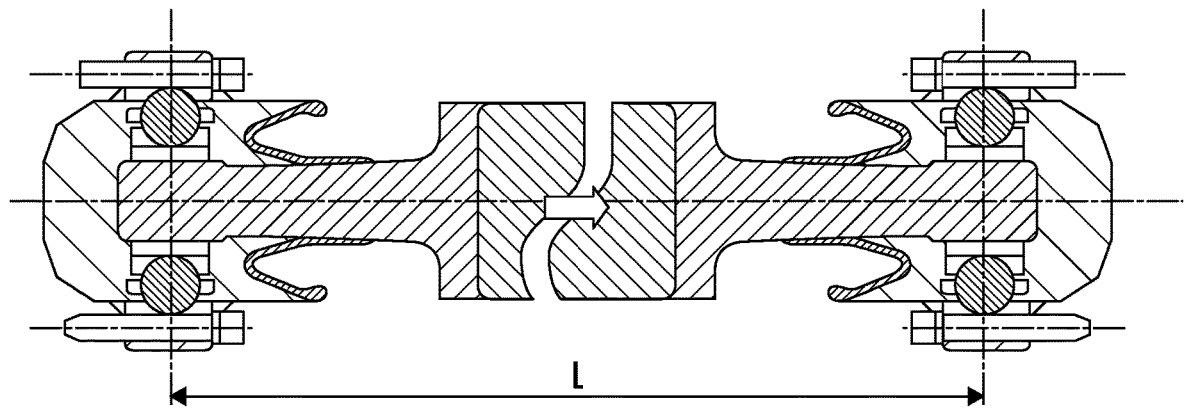
FIGS. 1A-1B are schematic cross-sectional side views of a known propeller shaft having two cross groove constant velocity joints.
Figure 1B:
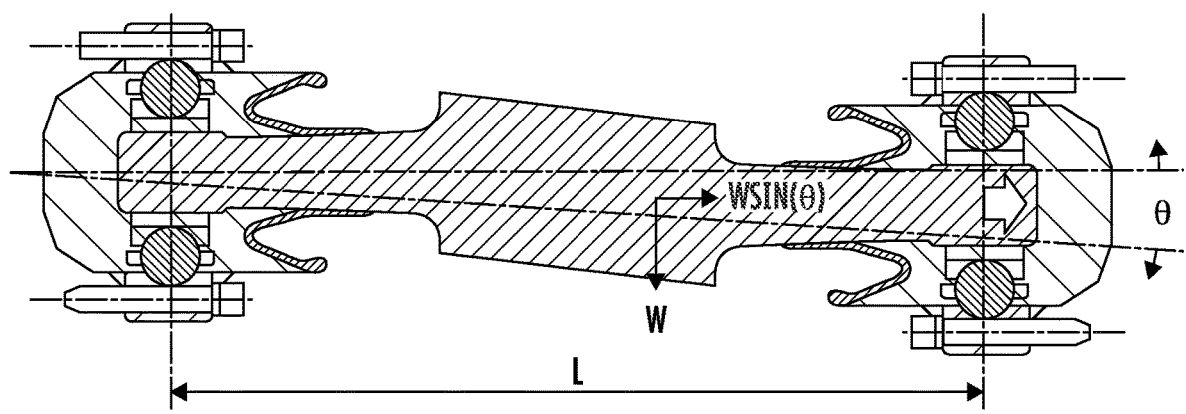
Figure 2:
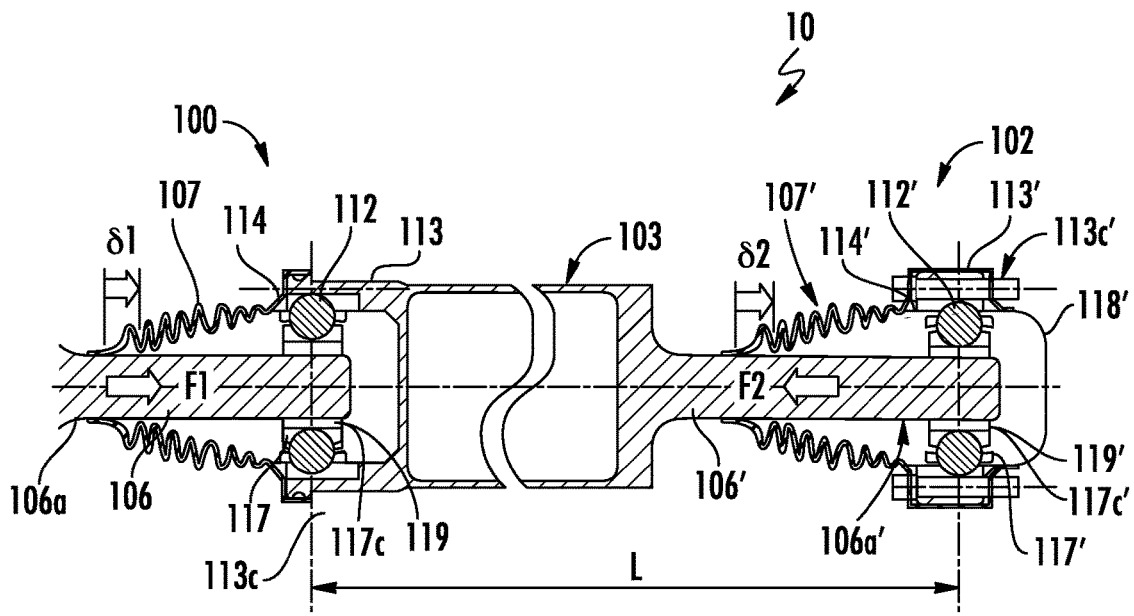
FIG. 2 is a schematic cross-sectional side view of a preferred embodiment of a propeller shaft.

Referring to FIG. 2, a propeller shaft 10 including two constant velocity cross groove joints 100, 102 and a connecting shaft 103 is depicted. The two cross groove joints 100, 102 are connected to each other by the connecting shaft 103. The cross groove joints 100, 102 each have an outer race 113, 113', an inner race 117, 117' and a cage 114, 114'. The outer race 113, 113' has an opening at least at one side in an axial direction. The inner race 117, 117' is slidably disposed inside the outer race 113, 113' allowing for movement in the axial direction. In some embodiments, the inner race 117, 117' and outer race 113, 113' can be made from a rigid material including, but not limited to, steel.

Figure 7A:
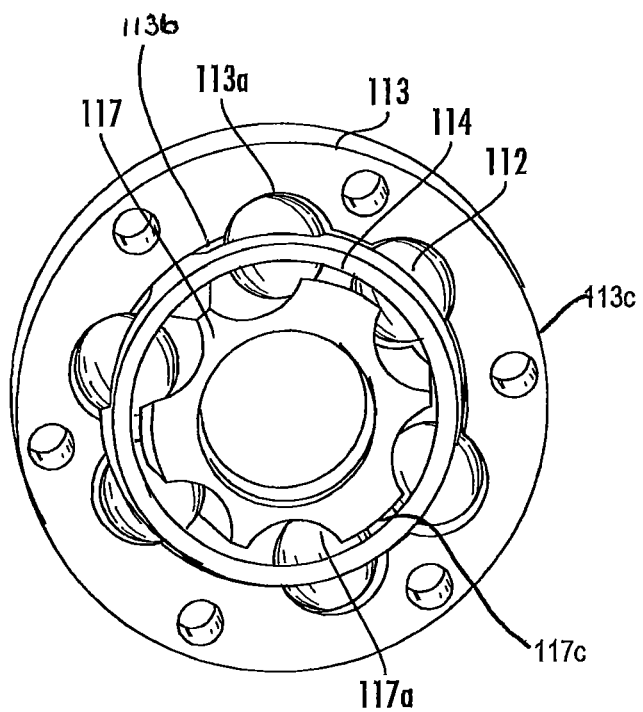
FIG. 7A is a front view of a preferred embodiment of cross groove joints with the inner race axially displaced from the outer race.

In some embodiments, as shown in FIG. 7A, the cross groove joints 100, 102 each have an outer race 113 (or 113') having a set of inwardly facing ball grooves 113a, an inner race 117 (or 117') having a set of outwardly facing ball grooves 117a and a cage 114 (or 114') positioned between the inner race 117 and the outer race 113.

Referring again to FIG. 2, a shaft 106, 106' is positioned inside the inner race 117, 117'. A boot 107, 107' connects the outer race 113, 113' and the shaft 106, 106'. In some embodiments, a grease cover 118' is placed on the end of the cross groove joint 102 opposite the boot 107' as shown in FIG. 2. It is to be noted that the shafts referred to hereinabove and hereinafter can be a shaft used to connect a differential gear unit and an automobile wheel together or a shaft used to connect a transmission or a combustion engine and the differential gear unit together.

Figure 8A:
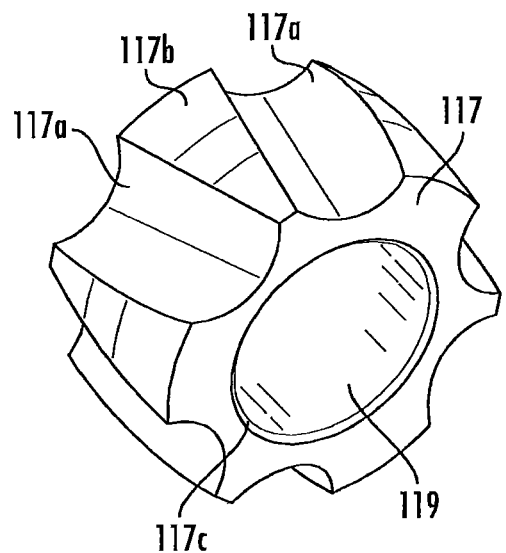
FIG. 8A is a perspective view of an inner race of the cross groove joint of FIGS. 7A-7C.

In some embodiments, as shown in FIG. 8A, the inner race 117 (or 117') has an outer surface 117b which is generally conical in shape and an inner surface 117c. The plurality of ball grooves 117a are formed in the outer surface 117b of the inner race 117. The grooves 117a extend axially and have generally semi-circular cross sectional shapes. The grooves 117a formed in the outer surface 117b of the inner race 117 are oriented so as to be alternately inclined relative to the rotational axis of the cross groove joints 100, 102.

The inner surface 117c, 117c' of inner race 117, 117' includes a bore 119, 119' that engages with the shaft 106, 106' as shown in FIG. 2. Shaft 106, 106' has an outer surface 106a, 106a' splined to mate with the splines (not shown) of the bore 119, 119' of inner race 117, 117'.

Figure 7B:
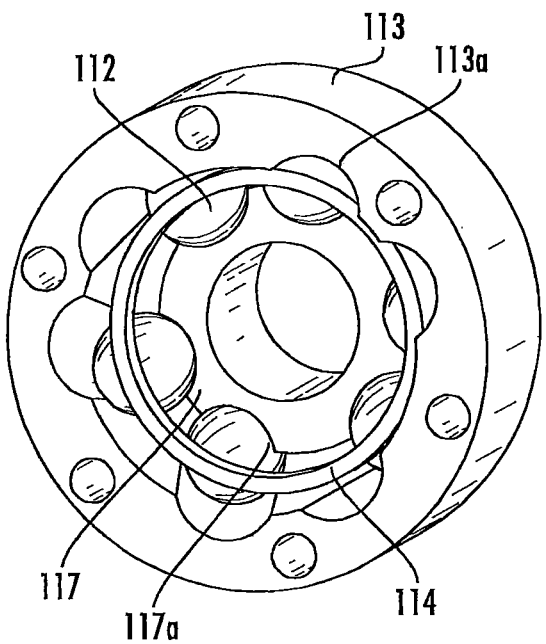
FIG. 7B is a rear view of a preferred embodiment of cross groove joints with the inner race axially displaced from the outer race.
Figure 7C:
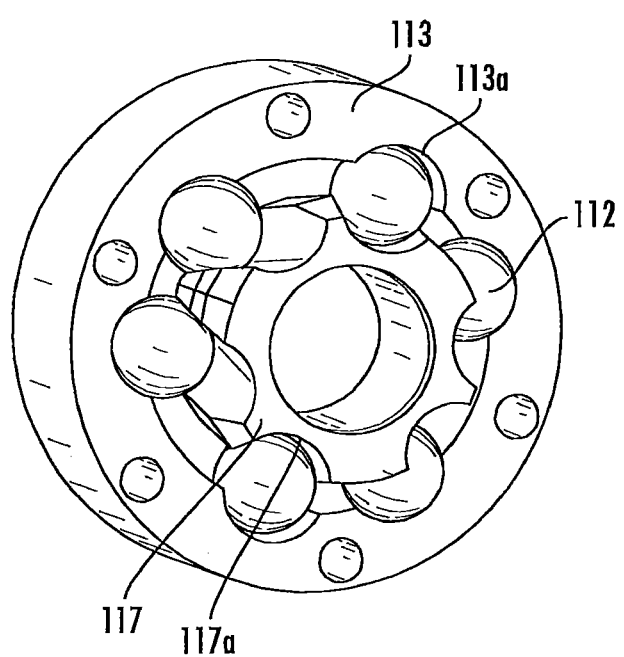
FIG. 7C is a front view of a preferred embodiment of cross groove joints with the inner race axially displaced from the outer race and the cage removed.
Figure 8B:
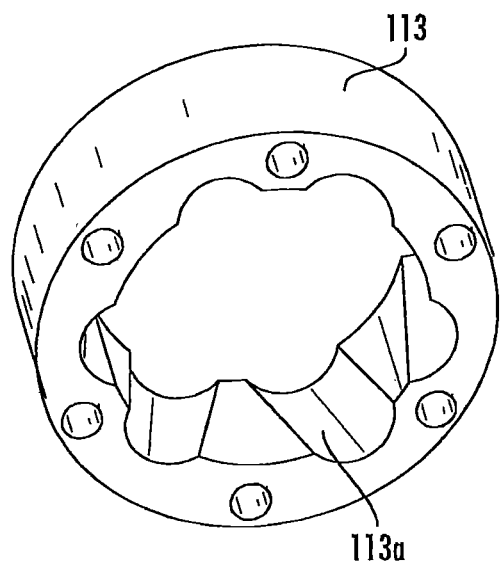
FIG. 8B is a perspective view of an outer race of the cross groove joint of FIGS. 7A-7C.

In some embodiments, as shown in FIG. 8B, the ball grooves 113a on the outer race 113 (or 113') are skewed axially at an angle. The ball grooves 117a on the inner race 117 (or 117') are skewed and formed alternately as shown in FIGS. 7A-7C. Each inner race ball groove 117a is coupled to an outer race ball groove 113a where each inner race ball groove 117a and outer race ball groove 113a face each other and form a crossed pair. Balls 112 (or 112') are disposed between ball grooves 113a, 117a and rollable therein. Torque is transmitted between the outer race 113 and the inner race 117 through the balls 112. In a preferred embodiment, the cross groove joints 100, 102 include six torque transmitting grooves/balls. However, it can be appreciated that a greater number of pairs of grooves and balls may be utilized.

Figure 8C:
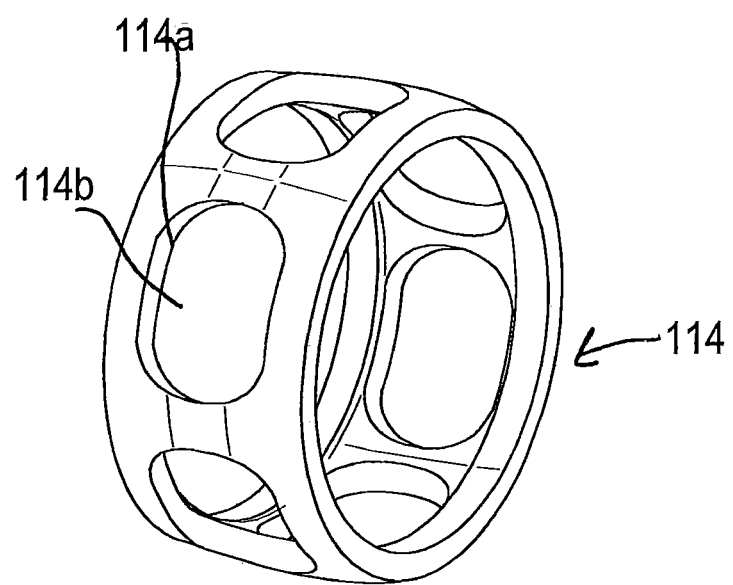
FIG. 8C is a perspective view of the cage of the cross groove joint of FIGS. 7A-7C.

The cage 114 (or 114') is disposed between an inner surface 113b of the outer race 113 and the outer surface 117c of the inner race 117 as shown in FIG. 7A. In some embodiments, the cage 114, as shown in FIG. 8C, is generally conical in shape and hollow. The cage 114 has a plural number of approximate windows 114b arranged equiangularly. The number of windows 114b is equal to the number of balls 112. In some embodiments, the cage 114 can be made from a rigid material including, but not limited to, steel.

In some embodiments, a snap ring 115, 115' can be used to retain inner race 117, 117' axially on the shaft 106, 106' as shown in FIG. 2. The inner race 117, 117' is secured to the shaft 106, 106' using a snap ring 115, 115' disposed in a groove (not pictured) formed in an outer surface of the shaft 106, 106'. Alternately, any other type of fastener may be used to secure the inner race 117, 117' to the shaft 106, 106'.

As shown in FIG. 2, a boot 107, 107' can be used to connect the shaft 106 with the outer race 113, 113'. The boot 107, 107' can be directly fixed to the outer surface 113c, 113c' of the outer race 113, 113' at its opening end by a clamp (not shown). The other end of the boot 107, 107' is directly fixed to the outer surface of the shaft 106, 106' by another clamp (not shown). The boot clamps can be made of a material including, but not limited to, steel. The boot 107, 107' seals the open end of the outer race 113, 113'. The boot 107, 107' is made of compressible material including, but not limited to, a thermoplastic material. The boot 107, 107' can be compressed axially as illustrated by 61, 62 and slide along the shaft 106, 106'. Compression forces F1, F2 generated by the boot compression keep the two joints 100, 102 in a center-aligned position.

In some embodiments, the grease cover 118' is placed on one end of the cross groove joint 102. The grease cover 118' generally has a cup shaped appearance. The grease cover 118' is generally made of a metal material; however, any, plastic, rubber, ceramic, composite material, and the like may also be used. In some embodiments, the grease cover 118' is press fit or connected to the outer surface 113c' of the outer race 113' by a fastener (not shown) or other securing method including, but not limited to, bonding, etc. The grease cover 118' prevents grease used as lubricant from leaking out of the cross groove joint 102.

In another embodiment, as shown in FIG. 8C, the cage 114 (or 114') includes windows 114b which limit the movement of balls 112 when the inner race 117 (or 117') is moved axially outside of the outer race 113 (or 113'). The windows 114b are formed having side walls 114a. In this embodiment, as, shown in FIGS. 9A and 10B, the diameter 114c of the windows 114b is slightly bigger than the diameter of the balls 112 (or 112') such that there is a small gap X, if any at all, between the side walls 114a of the windows 114b and the balls 112. The length 114d of the windows 114b is larger than the diameter of the balls 112 such that the gap Y exists between the balls 112 and the windows 114b.

Figure 9A:
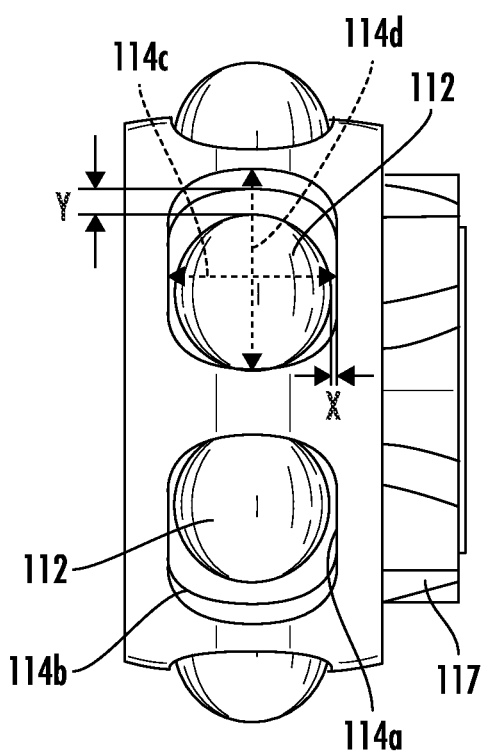
FIG. 9A is a side view of an inner race, a cage and balls of the cross groove joint of FIGS. 7A-7C when the inner race is not centered with the outer race.
Figure 9B:
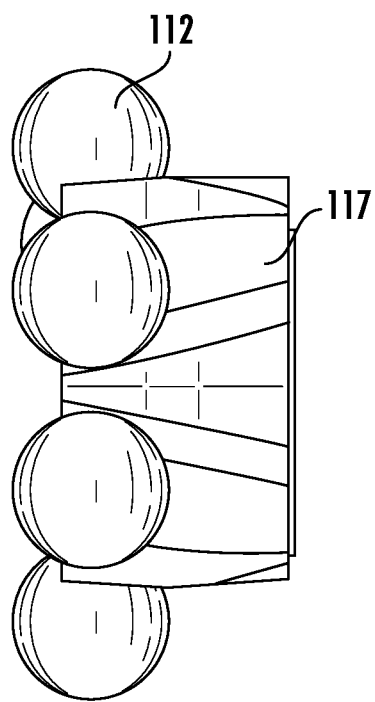
FIG. 9B is a side view of an inner race and balls of the cross groove joint of FIGS. 7A-7C when the inner race is not centered with the outer race.
Figure 10A:
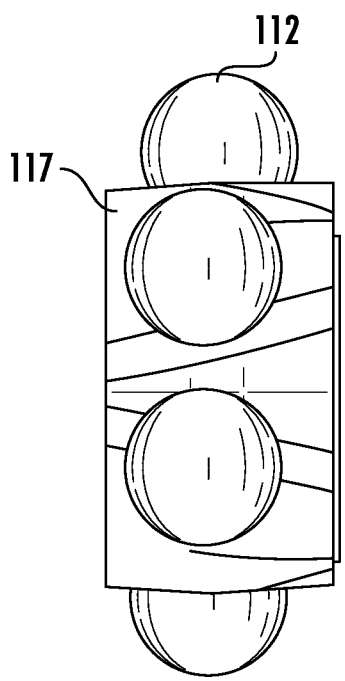
FIG. 10A is a side view of an inner race and balls of the cross groove joint of FIGS. 7A-7C when the inner race is centered with the outer race.
Figure 10B:
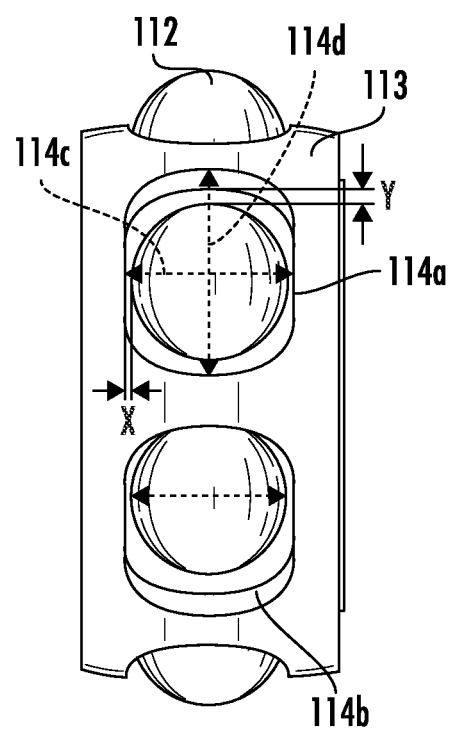
FIG. 10B is a side view of an inner race, cage and balls of the cross groove joint of FIGS. 7A-7C when the inner race is centered with the outer race.

As shown in FIGS. 10A-10B, when the inner race 117 (or 117') is in axial alignment with the outer race 113 (or 113'), the balls 112 (or 112') are centered in the inner race grooves 113a and the windows 114b and a gap X exists between the balls 112 and the windows 114b. When the inner race 117 is moved axially out of alignment with the outer race 113, the balls 112 move to the ends of the inner race grooves 113a as shown in FIG. 9B. The balls 112 are retained in the cross groove joints by the cage side walls 114a despite the axial displacement of the inner race 117, as shown in FIG. 9A.

Figure 3:
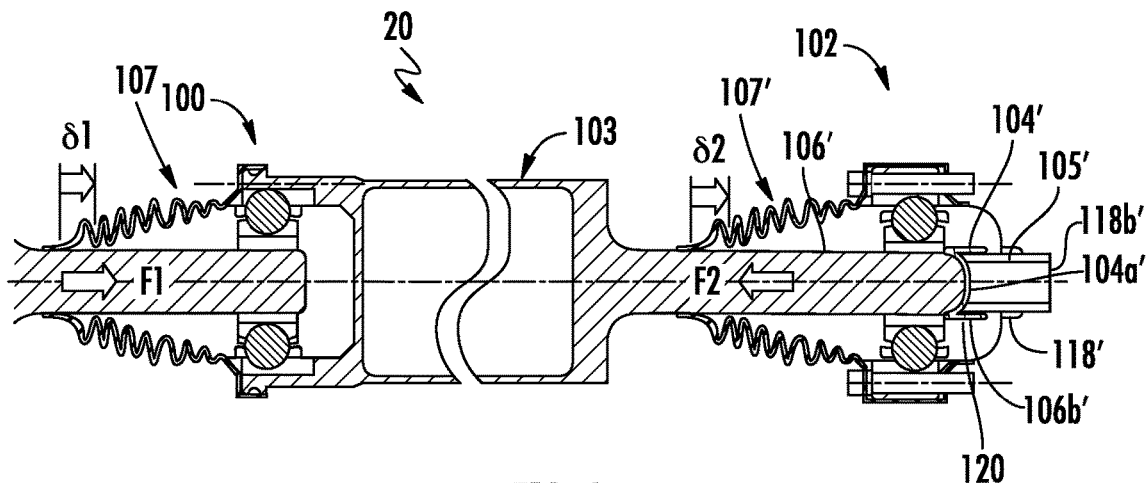
FIG. 3 is a schematic cross-sectional side view of another preferred embodiment of a propeller shaft.

In another preferred embodiment, as shown in FIG. 3, a propeller shaft 20 includes a spring mechanism 120 including a spring 105' and a spring seat 104'. The propeller shaft 20 is substantially similar to propeller shaft 10 and like components are designated with the similar numbers as in FIG. 2 and reference may be had to the discussion hereinabove with respect to these components. The spring mechanism 120 is positioned between the grease cover 118' and the shaft 106'. The spring seat 104' is positioned on one axial end of the spring mechanism 120 and has a partial concave sphere portion 104a' which mates with a partial convex sphere portion 106b' of the shaft 106'. The other axial end of spring mechanism 120 mates with a spring seat 118b' formed on the end of the grease cover 118'.

In some embodiments, the spring 105' is placed in a compressed state between the two axial ends of the spring mechanism 120. The spring 105' applies a force Fs to the other end of connecting shaft 103 forcing the connecting shaft 103 into the opposite cross groove 100, thereby preventing generation of noise and vibration of moving components of the propeller shaft 20. The spring mechanism 120 thus reduces the axial load generated when the connecting shaft 103 is at an angle between the two cross groove joints 100, 102.

Figure 4A:
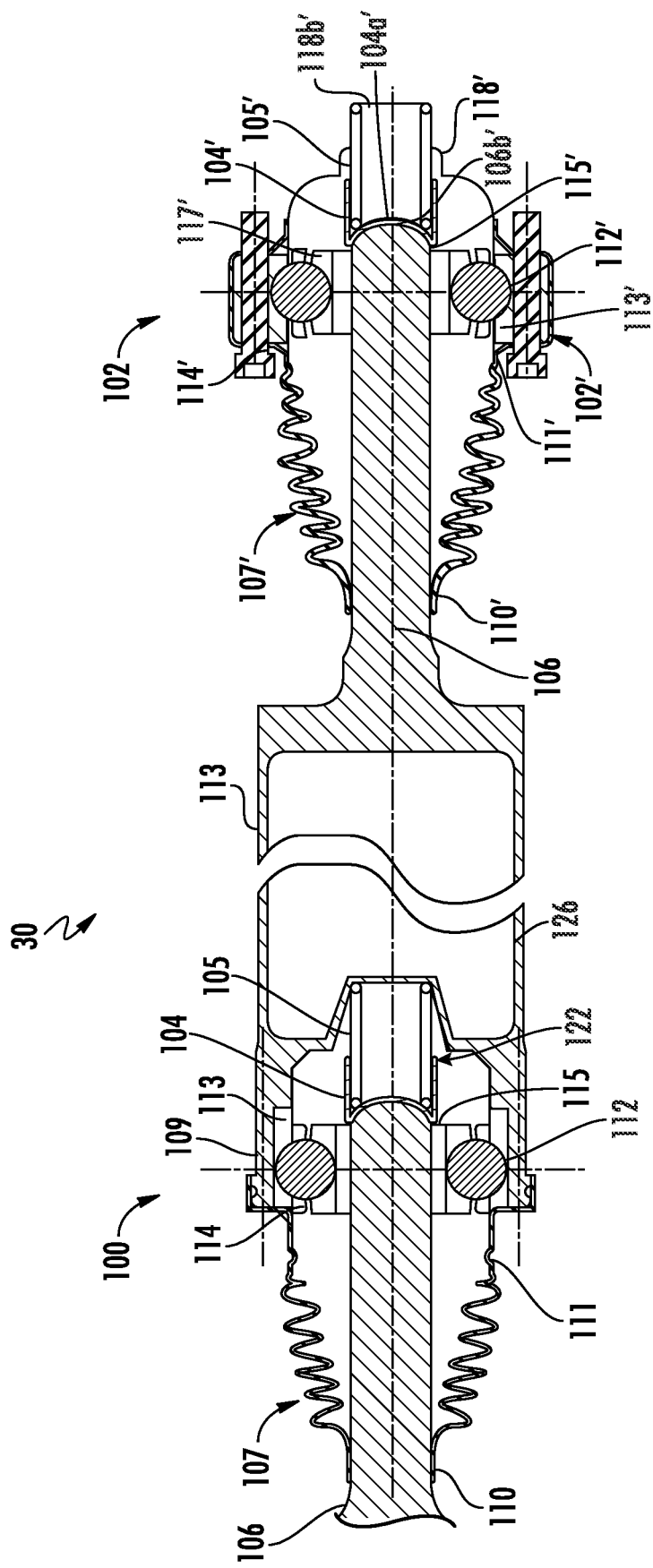
FIG. 4A is a schematic cross-sectional side view of another preferred embodiment of a propeller shaft.

In another preferred embodiment, as shown in FIGS. 4A-4C, a propeller shaft 30 includes a second spring mechanism 122 applied to cross groove joint 100. The propeller shaft 30 is substantially similar to propeller shaft 10 and like components are designated with the similar numbers as in FIG. 2 and reference may be had to the discussion hereinabove with respect to these components. The second spring mechanism 122 is positioned in the cross groove joint 100 between the shaft 106 and the connecting shaft 103. The spring seat 104 of spring mechanism 122 has a partial concave sphere portion 104a which mates with a partial convex sphere portion 106b of the shaft 106. The other axial end of the spring mechanism 122 meets with a spring seat 126 on the bottom of the outer race 113. The spring 105 is placed in a compressed state between the two axial ends of the spring mechanisms 120, 122. The spring 105' applies a force to the other end of connecting shaft 103 forcing the connecting shaft 103 into the opposite cross groove joint 100. Additionally, the spring 105 applies a force forcing connecting shat 103 into the cross groove joint 102. The spring mechanisms 120, 122 thus reduce the axial load generated when the connecting shaft 103 is at an angle between the two cross groove joints 100, 102. The other axial end of spring mechanism 120 mates with a spring seat 118b' formed on the end of the grease cover 118'. In some embodiments, as shown in FIG. 4C, a spring seat 118b' of the grease cover 118' has a groove 1183 on an inner surface thereof. An inner diameter of the groove 1183 has an increased diameter OD1 and a width W. The groove 1183 is designed to prevent the spring 105' (or 105) from being pulled out of the groove 1183 in the axial direction.

In some embodiments, a boot 107, 107' is placed around the joints 100, 102 with one end attached to the connecting shaft 106, 106' and the other end attached a boot can 111, 111' as shown in FIGS. 4A-4B. The boot 107, 107' is axially compressed after installation. The axial compression of the boot 107, 107' creates forces that keep the two joints 100, 102 axially centered. In some embodiments, the boot 107, 107' can have multiple convolutions creating peaks and valleys.

When the joints 100, 102 rotate at a high speed under high temperature conditions, the boot 107, 107' can invert radially due to the centrifugal forces and the grease load. The degree of radial inversion of the boot 107, 107' is primarily determined by the geometry of the first peak and first valley of the convolutions of the boot 107, 107' because the boot 107, 107' typically has the largest swing diameter in this region.

In another preferred embodiment, as shown in FIG. 5, a propeller shaft 40 includes two cross groove joints 100, 102 and a connecting shaft 103. The propeller shaft 40 is substantially similar to propeller shaft 10 and like components are designated with similar numbers as in FIG. 2 and reference may be had to the discussion hereinabove with respect to these components. The two cross groove joints 100, 102 are connected to each other by the connecting shaft 103. The cross groove joints 100, 102 each have an outer race 113, 113', an inner race 117, 117' and a cage 114, 114'. The inner race 117, 117' is slidably disposed inside the outer race 113, 113' allowing for movement in the axial direction. The inner race 117, 117' and outer race 113, 113' can be made from a rigid material including, but not limited to, steel. A shaft 106, 106' is positioned inside the inner race 117, 117', a boot 107, 107' connects the outer race 113, 113' and the shaft 106, 106' and a grease cover 118, 118' is placed on the end of the cross groove joints 100, 102 opposite the boot 107, 107'.

The inner surface 117c, 117c' of inner race 117, 117' includes a bore 119, 119' to engage with the shaft 106, 106'. The cage 114 (or 114') is disposed between the inner surface 113c of the outer race 113 and the outer surface 117c of the inner race 117'.

In some embodiments, the grease cover 118, 118' is placed on one end of the cross groove joints 100, 102. In some embodiments, the grease cover 118, 118' generally has a cup shaped appearance. The grease cover 118, 118' is generally made of a metal material; however, any, plastic, rubber, ceramic, composite material, and the like may also be used.

The grease cover 118, 118' is press fit or connected to the outer surface 113c, 113c' of the outer race 113, 113' by a fastener (not shown) or other securing method including, but not limited to, bonding, etc. The grease cover 118, 118' prevents grease used as lubricant from leaking out of the cross groove joints 100, 102. The grease covers 118, 118' are connected to axial opposite ends of the connecting shaft 103 which connects the two cross groove joints 100, 102.

FIGS. 6A-6D depict another preferred embodiment of a propeller shaft 50. The propeller shaft 50 is similar to propeller shaft 10 and like components are designated with similar numbers as in FIG. 2 and reference may be had to the discussion hereinabove with respect to these components. The propeller shaft 50 includes a connecting shaft 203 and two cross groove joints 200, 202. The joints 200, 202 include an outer race 213, 213', an inner race 217, 217', a cage 214, 214', a plurality of torque transferring elements or balls 212, 212', a boot 207, 207', a boot can 211, 211' and a grease cover 218, 218'.

In some embodiments, the outer race 213 (or 213') is a hollow cylindrical body formed from a rigid material including, but not limited to steel. A plurality of outer tracks are equally spaced and formed in an inner surface of the outer race 213.

In some embodiments, the inner race 217 (or 217') is a hollow member formed from a rigid material such as a steel; however, it is understood that the inner race 217 may be formed of any rigid material. The inner race 217 includes an inner race outer surface and an inner race inner surface. The inner race inner surface defines a cylindrical bore through the inner race 217. A plurality of splines (not shown) is formed on the inner race inner surface for drivingly engaging a shaft 206. A plurality of inner tracks are equally spaced about the axis in the inner race outer surface.

The plurality of tracks of the inner 217 and outer race 213 are skewed axially and formed alternately thereon. The tracks cross with each other and a plurality of torque transferring elements 212 (or 212'), or balls, are disposed between tracks of the inner race 217 and outer race 213. One ball 212 is disposed in each set of corresponding tracks of the inner race 217 and outer race 213.

The cage 214 (or 214') is disposed between the outer race 213 and the inner race 217. The cage 214 is a hollow body made of a rigid material, including, but not limited to steel. The cage 214 positions the balls 212 on a bisecting plane generated by the plurality of skewed tracks at an arbitrary articulation angle.

A shaft 206 having splines on the outer surface thereof extends through the cylindrical bore of the inner race 217 and the splines of the connecting shaft 2016 mate with the splines on the inner race 217. A snap ring 215 (or 215') retains the inner race 217 axially on the shaft 206.

A boot 207 (or 207') is positioned around and in sealing engagement with the shaft 206 and a boot can 211. The boot can 211 (or 211') is positioned around the shaft 206 with one axial end attaching to the boot 207 and the other axial end attaching to the outer race 213. In one embodiment, clamping devices 210 can be used to secure the boot 207 to the shaft 206 and the boot can 211. The clamping devices 210 can be band style clamps; however, it is understood that other types of clamping devices may be used.

The joints 200, 202 can also include a spring mechanism 220. The spring mechanisms 220 can include a spring 205 having a spring seat 204 on one axial end thereof having a concave shape. The spring seat 204 mates with one axial end 206b of the shaft 206 having a convex shape. The other end of the spring assemblies mate with either a spring seat 218b formed on a grease cover 218 or a spring seat 226 of the outer race 213.

Figure 6A:
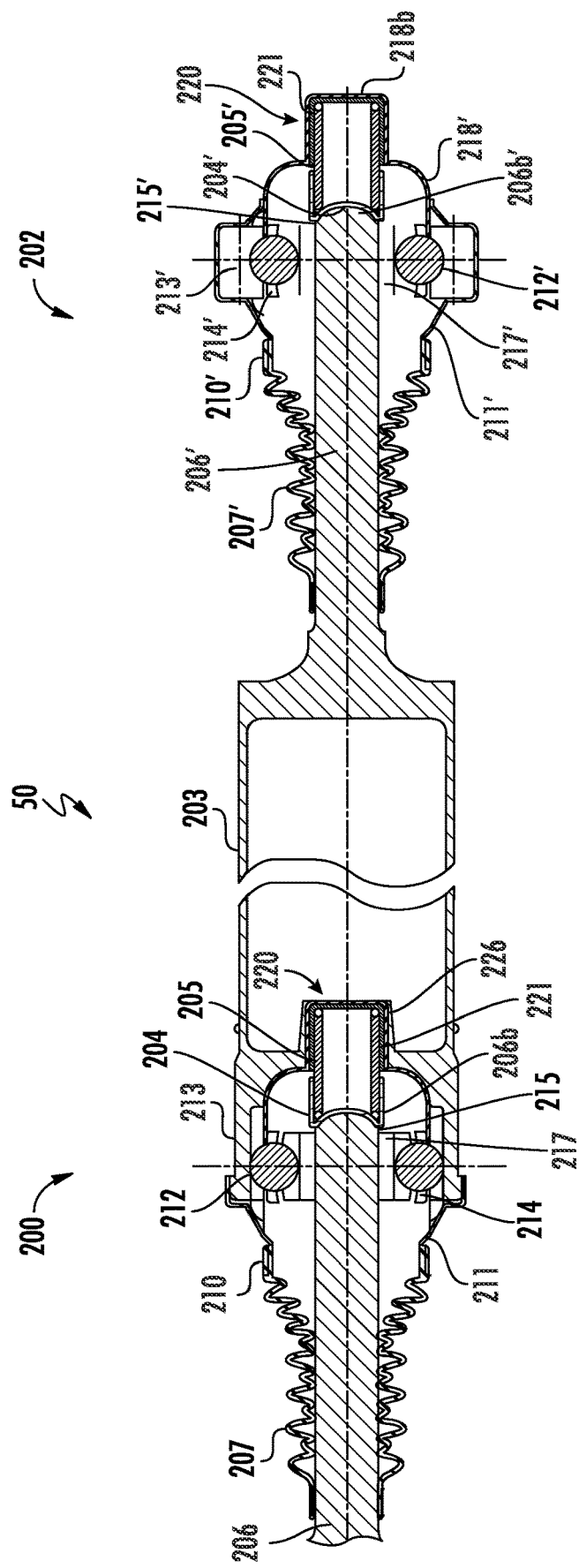
FIG. 6A is a cross-sectional side view of another preferred embodiment of a propeller shaft.
Figure 6B:
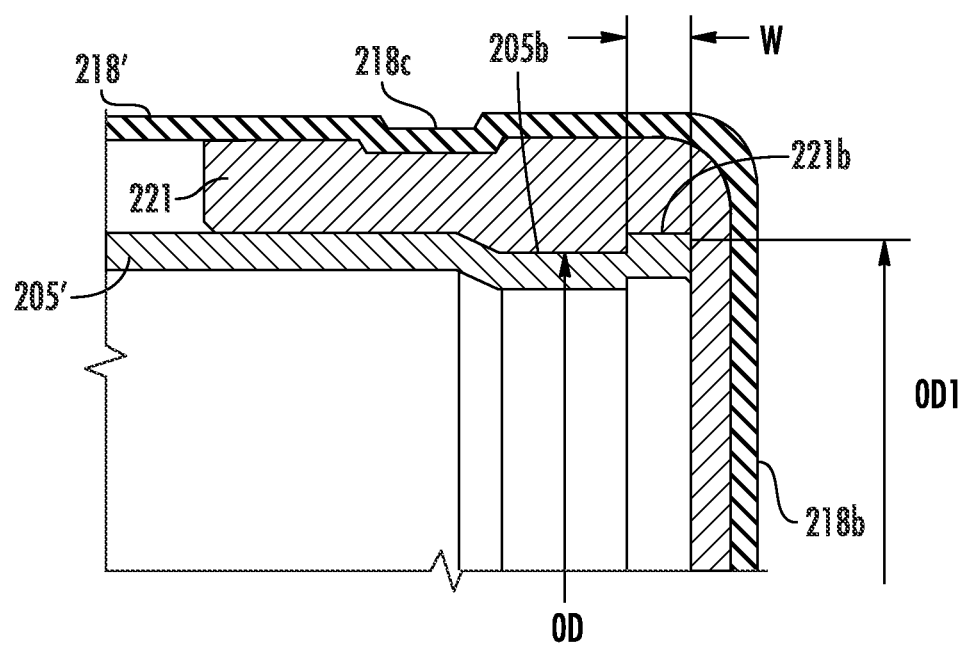
FIG. 6B is a detailed section view of the grease cover and spring mechanism of the propeller shaft in FIG. 6A.

As shown in FIG. 6B, in one embodiment a spacer 221 is positioned between the spring 205 (or 205') and the grease cover 218 (or 218'). The spacer 221 fits near the spring seat 218b around the end of the spring 205. The grease cover 218 can also have a flank or reduced diameter portion 218c near the axial end thereof. In some embodiments, the grease cover 218 is attached to the spacer 221. The grease cover 218 can be caulked or staked to the spacer 221 at the flank portion 218c. The flank portion 218c can align or mate with a similarly shaped grove in the outer surface of the spacer 221 which prevents the spacer 221 from moving. Additionally, the spring 205 can have a reduced diameter portion 205b with an outer diameter OD near the end thereof and an axial end portion 221b with an outer diameter OD1 that is greater than OD and a width W. The width of the end portion 221b prevents the spring 205 from moving in the axial direction.

FIG. 6C depicts one embodiment of the boot 207. The boot 207 (or 207') is attached to the boot can 211 (or 211') and the shaft 206 using clamping devices 210. In some embodiments, the boot 207 is composed of thermoplastic material.

In some embodiments, the boot 207 includes a first attachment portion 2094, a second attachment portion 2096 and multiple convolutions between the first and second attachment portions 2094, 2096. The first attachment portion 2094 is connected to the shaft 206 and the second attachment portion 2096 is connected to the boot can 211. In some embodiments, clamp devices 210 are positioned around the attachment portions 2094, 2096 of the boot 207 to secure the boot 207 to the shaft 206 and the boot can 211 respectively; however it is understood that other fasteners could also be used.

In one embodiment, as shown in FIG. 6C, the boot 207 has a plurality of convolutions. In one preferred embodiment, the boot 207 has eleven convolutions including a first valley 2071, a first peak 2072, a second valley 2073, a second peak 2074, a third valley 2075, a third peak 2076, a fourth valley 2077, a fourth peak 2078, a fifth valley 2079, a fifth peak 2080, a sixth valley 2081, a sixth peak 2082, a seventh valley 2083, a seventh peak 2084, an eighth valley 2085, an eighth peak 2086, a ninth valley 2087, a ninth peak 2088, a tenth valley 2089, a tenth peak, 2090, an eleventh valley 2091 and an eleventh peak 2092. The valleys and peaks 2071, 2072, 2073, 2074, 2075, 2076, 2077, 2078, 2079, 2080, 2081, 2082, 2083, 2084, 2085, 2086, 2087, 2088, 2089, 2090, 2091, 2092 are positioned axially between the two attachment portions 2094, 2096.

The boot 207 is a unitary piece of construction including the attachment portions 2094, 2096 and the valleys and peaks 2071, 2072, 2073, 2074, 2075, 2076, 2077, 2078, 2079, 2080, 2081, 2082, 2083, 2084, 2085, 2086, 2087, 2088, 2089, 2090, 2091, 2092 of the convolutions.

In some embodiments, a first set of convolutions including the first valley 2071, first peak 2072, second valley 2073, second peak 2074, third valley 2075 and third peak 2076 is positioned axially adjacent the attachment portion 2096 and absorbs primarily the articulation motion of the joints 200, 202. In further embodiments, a second set of convolutions is positioned axially adjacent to the first set of convolutions and includes the fourth valley 2077, fourth peak 2078, fifth valley 2079, fifth peak 2080, sixth valley 2081, sixth peak 2082, seventh valley 2083, seventh peak 2084, eighth valley 2085, eighth peak 2086, ninth valley 2087, ninth peak 2088, tenth valley 2089, tenth peak, 2090, eleventh valley 2091 and eleventh peak 2092 and absorbs primarily the plunging motion of the joints 200, 202.

The peaks and valleys 2071, 2072, 2073, 2074, 2075, 2076, 2077, 2078, 2079, 2080, 2081, 2082, 2083, 2084, 2085, 2086, 2087, 2088, 2089, 2090, 2091, 2092 have outer diameters defined by the distance between the center of the joints 200, 202 and the outer surface of the boot 207. The outer diameters of the peaks of the first set of convolutions gradually decrease from the first peak 2072 to the third peak 2076. Additionally, the outer diameters of the valleys of the first set of convolutions decrease gradually from the first valley 2071 to the third valley 2075.

In some embodiments, the second set of convolutions has four uniform groups of peaks and valleys. The first group includes the fourth peak 2078 which has an outer diameter smaller than the outer diameters of the third and fifth peaks 2076, 2080. The second group includes the sixth peak 2082 which has an outer diameter smaller than the outer diameters of fifth and seventh peaks 2080, 2084. The third group includes the eighth peak 2086 which has an outer diameter smaller than the outer diameters of the seventh and ninth peaks 2084, 2088. The fourth group includes the tenth peak 2090 which has an outer diameter smaller than the outer diameters of the ninth and eleventh peaks 2088, 2092.

In one embodiment, the outer diameters of the third 2076, fifth 2080, seventh 2084, ninth 2088 and eleventh peaks 2092 are relatively equal to each other. The outer diameters of the fourth 2077, fifth 2079, sixth 2081, seventh 2083, eighth 2085, ninth 2087, tenth 2089 and eleventh 2091 valleys are relatively equal to each other and smaller than the outer diameter of the third valley 2075.

Figure 6D:
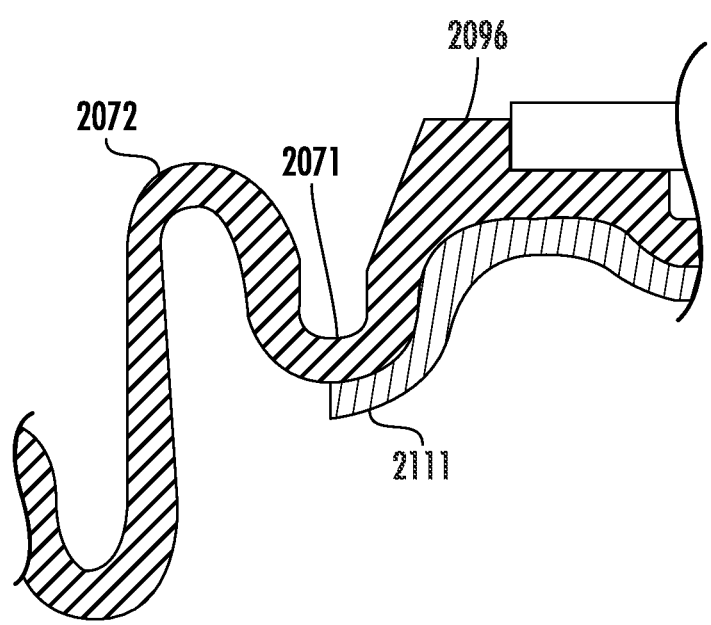
FIG. 6D is a detailed section view of the attachment portion of the boot in FIG. 6C.

In some embodiments, to minimize the radial inversion of the first valley 2071 and first peak 2072 by the grease load contained in the joints 200, 202, the boot can 211 have a rounded edge 2111 that extends axially under the attachment portion 2096 of the boot 207 and partially under the first valley 2071 of the first set of convolutions as depicted in FIG. 6D.

In accordance with the provisions of the patent statutes, the embodiments have been described in what is considered to represent its preferred embodiments. However, it should be noted that the invention can be practiced otherwise than as specifically illustrated and described without departing from its spirit or scope.

What is claimed:
1. A propeller shaft assembly, comprising:
a first shaft;
a first constant velocity joint drivingly connected with the first shaft;
a second shaft;
a second constant velocity joint drivingly connected with the second shaft;
a connecting shaft drivingly connected to the first constant velocity joint and the second constant velocity joint;
a first grease cover disposed about an axial end of the second constant velocity joint;
wherein the second constant velocity joint is provided with a spring mechanism including a spring, wherein a spring seat of the spring mechanism is positioned on one axial end of the spring and mates with the second shaft, and wherein another axial end of the spring mates with an additional spring seat that is formed in the first grease cover of the second constant velocity joint;
wherein at least one of the first and second constant velocity joints comprises:

an outer race having an opening at least at one side in an axial direction and a set of inwardly facing ball grooves;
an inner race disposed inside of the outer race and having a set of outwardly facing ball grooves;
a plurality of balls is disposed in the outer race ball grooves and the inner race ball grooves for transmitting torque between the outer race and the inner race;
a boot disposed about the outer race;
a cage positioned between the outer race and inner race having a plurality of windows formed therein configured to accommodate the plurality of balls therein;
wherein the second constant velocity joint further comprises a spacer positioned between the spring and the first grease cover and attached to the first grease cover; and
wherein the spring has an axial end portion and a reduced diameter portion, wherein an outer diameter of the reduced diameter portion is less than an outer diameter of the axial end portion.

2. The propeller shaft assembly of claim 1, wherein the spring seat has a partial concave sphere portion that mates with a partial convex sphere of the second shaft.

3. The propeller shaft assembly of claim 2, further comprising a second grease cover disposed about an axial end of the first constant velocity joint, wherein the first constant velocity joint is provided with a spring mechanism including a spring, wherein a spring seat is positioned on one axial end of the spring and mates with the first shaft, and wherein another axial end of the spring mates with an additional spring seat that is formed in the axial end of the second grease cover of the first constant velocity joint.

4. The propeller shaft assembly of claim 1, wherein the cage of the at least one of the first constant velocity joint and the second constant velocity joint further comprises a gap between the plurality of balls and sidewalls of the windows of the cage.

5. The propeller shaft assembly of claim 1, wherein the first grease cover has a reduced diameter portion and wherein the spacer is attached to the first grease cover at the reduced diameter portion.

6. The propeller shaft assembly of claim 1, further comprising a boot can, wherein the boot of the at least one of the first constant velocity joint and the second constant velocity joint includes:
a first attachment portion;
a second attachment portion;
a first set of convolutions including peaks and valleys having gradually reducing diameters axially adjacent the second attachment portion;
a second set of convolutions having peaks and valleys axially adjacent the first set of convolutions and the first attachment portion;
wherein the first attachment portion is connected to the connecting shaft; and
wherein the second attachment portion is connected to the boot can.

7. The propeller shaft assembly of claim 6, wherein the second set of convolutions has a plurality of groups of convolutions wherein each group of convolutions includes a first valley, a first peak, a second valley and a second peak, wherein an outer diameter of the first peak is smaller than an outer diameter of the second peak, and wherein an outer diameter of the second peak is equal to or less than an outer diameter of at least one peak of the first set of convolutions.

8. The propeller shaft assembly of claim 6, wherein the second set of convolutions of the boot includes four groups of convolutions.

9. The propeller shaft assembly of claim 6, wherein the boot can includes a rounded edge portion that is in contact with the boot.

10. The propeller shaft assembly of claim 6, wherein the boot can is in contact with a first valley of the first set of convolutions of the boot.

11. The propeller shaft assembly of claim 7, wherein the outer diameters of the first and second valley of the second set of convolutions are equal to or less than an outer diameter of at least one valley of the first set of convolutions.

12. The propeller shaft assembly of claim 1, further comprising a second grease cover disposed about an axial end of the first constant velocity joint, wherein the grease covers are connected to the connecting shaft at axial opposite ends thereof.

13. A propeller shaft assembly, comprising:
a first shaft;
a first constant velocity joint drivingly connected with the first shaft;
a second shaft;
a second constant velocity joint drivingly connected with the second shaft;
a connecting shaft drivingly connected to the first constant velocity joint and the second constant velocity joint;
a grease cover disposed about an axial end of the second constant velocity joint;
wherein the second constant velocity joint is provided with a spring mechanism including a spring, wherein a spring seat of the spring mechanism is positioned on one axial end of the spring and mates with the second shaft, and wherein another axial end of the spring mates with an additional spring seat that is formed in the grease cover of the second constant velocity joint;
wherein the additional spring seat formed in the grease cover of the second constant velocity joint has a groove formed in an inner surface thereof, wherein the groove has an increased diameter needed to prevent the spring from being pulled out of the groove;
wherein at least one of the first and second constant velocity joints comprises:
an outer race having an opening at least at one side in an axial direction and a set of inwardly facing ball grooves;
an inner race disposed inside of the outer race and having a set of outwardly facing ball grooves;
a plurality of balls are disposed in the outer race ball grooves and the inner race ball grooves for transmitting torque between the outer race and the inner race;
a boot disposed about the outer race; and
a cage positioned between the outer race and inner race having plurality of windows formed therein configured to accommodate the plurality of balls therein.

* * * * *